United States Patent Office 2,822,769
Patented Feb. 11, 1958

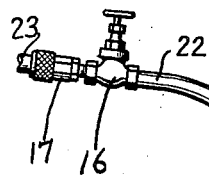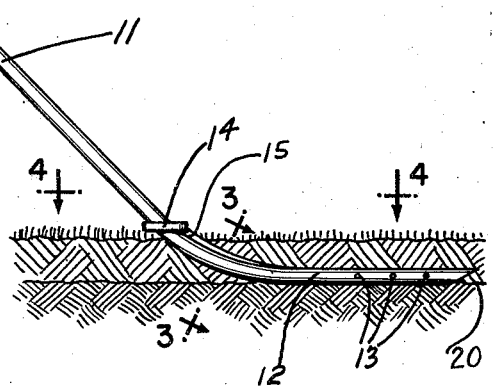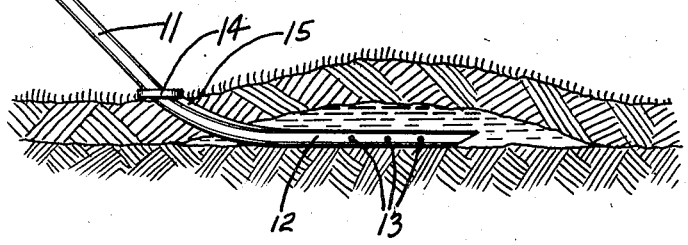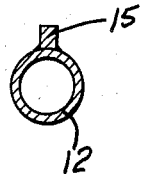
Feb. 11, 1958 — W. A. GREEN — 2,822,769
MEANS FOR SUB-IRRIGATION
Filed Aug. 30, 1954
Fig. 1
Fig. 2
Fig. 3
Fig. 4
INVENTOR.
Wilbur A. Green
BY Barnes, Seed and Secrest
attys.

2,822,769
MEANS FOR SUB-IRRIGATION
Wilbur A. Green, Seattle, Wash.
Application August 30, 1954, Serial No. 453,009
5 Claims. (Cl. 111—7.1)

This invention relates to a means and method for sub-irrigation and particularly, to a means and a method for sub-irrigating grass and like plant growth which covers the ground with a mat-like root growth.

An object of this invention is the provision of a means and method for the addition of water at about the sod level of grass.

As a further object this invention aims to provide a means and method, non-injurious to the grass, for raising the grass mat so as to loosen the root system of the same and make the mat more permeable to passage of air and water.

A still further and important object of this invention is the provision of a means and method for sub-irrigating grass and the like without undue disturbance of the soil structure underlying the sod.

With yet additional objects and advantages in view which, with the foregoing, will appear and be understood in the course of the following description and claims, the invention consists in the new method of sub-irrigating a lawn and in the novel implement for performing said method, hereinafter described and claimed.

In the accompanying drawings:

Figure 1 is a side elevational view of a sub-irrigating implement constructed in accordance with the preferred embodiment of the present invention, and which illustrates the implement as inserted under grass sod preparatory to sub-irrigating the latter.

Fig. 2 is a fragmentary side elevational view illustrating the manner in which the sub-irrigating implement performs its intended sub-irrigating function, and namely feeding a pocket of water under pressure below the sod.

Fig. 3 is a transverse sectional view drawn to an enlarged scale on line 3—3 of Fig. 1; and Fig. 4 is a horizontal sectional view drawn to an enlarged scale on line 4—4 of Fig. 1, and with the lip end thereof broken away and shown in section.

In the growing of grass and the like the grass and the accompanying root system are generally contained in the upper two to four inches of the ground and cover the ground proper in the form of a grass mat. In certain lawns because of the nature of the soil and lack of proper care this grass mat becomes packed and hard so as to prevent the proper circulation of air and water therethrough, and in the course of time lose their well-kept appearance on account of the dry condition and inability to absorb moisture. To alleviate this condition I have devised a means and a method for conditioning said grass mat so that the roots of the grass receive sufficient water and at the same time the mat is loosened and made more permeable to the circulation of air and water. This means comprises a nozzle adapted to be inserted into the ground so that the same is substantially parallel to the grass mat, and having a series of outlet openings transverse to the longitudinal axis of the nozzle. The method comprises the deposit of a pressure pocket of water underneath the grass mat to raise the same off the ground proper and to loosen the root system thereof.

Proceeding now to describe the sub-irrigating means it is seen that the same comprises a tube or pipe 11 whose lower extremity bends through an inside angle of approximately 135° to form a nozzle portion 12. This angle has been arrived at as being the most desirable from the standpoint of permitting a user to insert the nozzle with ease and expedition under the sod into a position whereat the same is disposed approximately parallel to the grass surface, as indicated in Figs. 1 and 2. The nozzle portion proper comprises a series of outlet openings 13 for the irrigating water provided along each side and directed laterally with their axes transverse to the longitudinal axis of the nozzle. The front end of the nozzle is cut on the bias, as at 20 and has a plug 21 fixed therein so that the full flow of water issues from the lateral openings 13.

On the pipe 11 and spaced at a moderate distance above the bend there is provided a foot-press 14. this foot-press being formed from bar stock with a hole cut therein so as to be slipped upon the pipe, and being then tack-welded in place. Extending downwardly from this foot-press as a reinforcement for the bend there is welded to the pipe a rib 15.

The pipe, on the end thereof opposite the nozzle, is again bent, as at 22, more or less parallel to the nozzle, and fitted upon the end of this terminal section 22 is a valve means, preferably a gate valve 16, for regulating the flow of water. A coupling 17 threadably attached to the valve permits the implement to be connected to a source of water, such as a garden hose 23.

As is seen from the drawing the method of using this sub-irrigating means is to insert the nozzle into the grass mat to have the nozzle lie immediately below and parallel thereto. If necessary the person working the nozzle into the ground can step on the foot-press to force the nozzle into the ground.

Upon the opening of the valve means the water flows substantially horizontally out of the outlet openings 13 to produce a pool or pocket of water between the grass mat and the ground proper. This raises the grass mat to produce that which is in effect a surface blister. The pool of water is gradually absorbed by the grass mat and the underlying ground giving new vitality to the roots and permitting the turf to develop the springy condition which is essential for healthy growth.

It is seen that in this method of sub-irrigation none of the valuable soil surrounding the grass roots and none of the ground soil proper is washed away during the process of revitalizing the roots.

Although I have elected to show my implement as being equipped with a gate valve, so as to assure full water flow, it is self-evident that other types could be employed. In addition to the use of my invention as a sub-irrigating means the same perforce lends itself to use in fertilization. This is to say that water-soluble liquid or powder fertilizers may be readily bled into the water which is fed to the implement.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A sub-irrigating implement comprising a pipe providing a moderately long section adapted to be held in the hand, having at one end thereof a coupling for joining the pipe to a source of water supply under pressure, and at the other end presenting an elbow bend of approximately 135° terminating in a straight nozzle which is of short length compared with the length of the handle section, said implement in use being adapted to have the nozzle inserted in the ground with the inside angle of the elbow uppermost and such that the nozzle lies a moderate distance below and approximately parallel with the surface of the ground, the nozzle being imperforate along the top and being provided along the sides with laterally directed small diameter outlet openings spaced at intervals of the length, the nozzle being closed at the end so that the full pressure of water flowing through the pipe will be concentrated on said side openings.

2. The implement of claim 1 in which the closed outer end of said nozzle is cut on the bias for ease of working the nozzle under a mat of grass.

3. The implement of claim 1 in which the handle is provided with a foot-press adjacent said elbow and substantially parallel with said nozzle.

4. The implement of claim 3 in which a reinforcing web is secured at one end to said foot-press and extends therefrom along said pipe through the full extent of said elbow to said nozzle.

5. The implement of claim 1 in which the outer end of said handle is provided with a valve.

References Cited in the file of this patent
UNITED STATES PATENTS

| | | |
|---|---|---|
| 708,126 | Chase | Sept. 2, 1902 |
| 1,175,593 | Brown | Mar. 14, 1916 |
| 1,755,445 | Irish | Apr. 22, 1930 |
| 2,018,003 | Axtell | Oct. 22, 1935 |
| 2,172,574 | Campbell | Sept. 12, 1939 |
| 2,655,408 | Williams | Oct. 13, 1953 |